(12) United States Patent
Taylor (10) Patent No.: US 7,917,571 B2
(45) Date of Patent: Mar. 29, 2011

(54) COMMUNICATION WITHIN A COMMUNICATION NETWORK

(75) Inventor: Richard Taylor, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2126 days.

(21) Appl. No.: 10/207,069

(22) Filed: Jul. 30, 2002

(65) Prior Publication Data

US 2003/0028617 A1 Feb. 6, 2003

(30) Foreign Application Priority Data

Jul. 31, 2001 (GB) .................................. 0118655.0

(51) Int. Cl.
*G06F 15/16* (2006.01)
(52) U.S. Cl. ........................................ 709/201; 709/203
(58) Field of Classification Search .................. 709/203, 709/201
See application file for complete search history.

(56) References Cited

U.S. PATENT DOCUMENTS

| | | | | |
|---|---|---|---|---|
| 5,905,865 | A * | 5/1999 | Palmer et al. ................. | 725/112 |
| 6,216,161 | B1 * | 4/2001 | Feigenbaum et al. ........ | 709/225 |
| 6,615,046 | B1 * | 9/2003 | Ur ................................ | 455/445 |
| 2002/0132575 | A1 * | 9/2002 | Kesling et al. ............... | 455/2.01 |

FOREIGN PATENT DOCUMENTS

WO 01/41030 6/2001

OTHER PUBLICATIONS

"Method and system for advertising products and services over a communication network" by Marius et al. WO 01/41030 A1 (cited in applicant's IDS).*

* cited by examiner

*Primary Examiner* — John Follansbee
*Assistant Examiner* — Glenford Madamba (57) ABSTRACT

A web page, including clickthroughs, is cached at a location within a network intermediate a client requesting the page and the host web site for the page. Clickthrough activation (in session cache on the client machine, or in the network cache) causes a javascript program to generate an activation identifier giving the IP address of the machine activating the clickthrough and the time. This ID and an ID for the IP address from which the web page originally hosting the clickthrough was retrieved are sent to the host web site. Generating such identifiers is applicable to text messages, e.g. sent out by a publicity agent, and actuable to connect to a telephone number held by an enterprise within the telephone network. Activating such a text message causes the return of suitable identifiers to the publicity agent to enable them to seek renumeration from the enterprise.

44 Claims, 5 Drawing Sheets

```
//
// Simple java implementation of click through labelling
// data in this example is carried in clear, although DES
// can be used to generate secure messages for guaranteeing
// that data has come from correct place import java.net.*;
import java.io.*;
import java.security.*;
import javax.crypto.*;
import javax.crypto.spec.*;

// create URL objects
URL url=null;
// creat cIPnumber objects
IP  ip=null, ipfrom=null; ipto=null;

// URL
try {
 url = new URL(from); // originator
} catch(MalformedURL exception e){ /* ignore this exception */ }

// IP address
try {
 ip = MyIP(); // me (cache)
 ipfrom = OrigIP(); // where I came from
 ipto = ToIP; // where I'm going to
} catch(MalformedIP exception e){ /* ignore this exception */ } try {
 url = combine(url,MyIP); // mangle URL to carry through message -
first ID
 connect(url); // do communication
}
catch(MalformedURL exceptioin e) {}

// transfer audit  information
try {
 InetAddress address = ToIP; // going to
 int port = 1600;       // port to connect to
 byte[] message = crypt(MyIP, url); // combined from with url to
provide 2nd ID
 DatagramSocket s = newDatagramSocket();
 DatagramPacket p = new DataGramPacket(nessage, message.length,
address, port);
}
catch(MalformedSocket exception e) {}
catch (SocketException e) {}
```

COMMUNICATION WITHIN A COMMUNICATION NETWORK

BACKGROUND TO THE INVENTION

1. Field of the Invention

The present invention relates to the establishment of communication within a network between a client, who is usually a potential customer, and a predetermined network location which is usually an enterprise that potentially is able to profit from communication with the client. Frequently such communications are unsolicited by the client, and take place as a result of solicitation by a third party with a pecuniary interest in establishing such communications; for example because they are paid by the enterprise to do so. An example of such a communication is the use of a hyperlink on a banner advert in a web site. In particular the present invention is concerned with enabling the third party to be able to verify to the enterprise that it had a role in the establishment of such communications worthy of pecuniary reward.

2. Description of Related Art

One frequent arena in which this issue arises is the use of the internet to view web pages. A user who gains access to a particular page on the worldwide web does so typically by typing the web address, or Uniform Resource Locator ("URL") of the page in their web browser (a programme that functions to enable a user to download and display documents on a web page). In fact the act of accessing the page actually involves downloading a copy of most of the digital information that constitutes the page of interest to the computer (i.e. the client) from which the page is being viewed. The downloaded elements of the page are then stored for the duration of that web session in temporary memory, known as a cache, and from which they are viewed; typically the cache for this purpose (known hereinafter as the "session cache") is located in the client. This manner of accessing and viewing web pages has great efficiency gains. For example, actions such as scrolling up and down a page do not involve the transmission of corresponding commands across the network, since the copy of the web page that is being viewed is not located on the site in question, but in the session cache within the client.

A further caching process is also employed to produce efficiency gains when accessing web pages at sites that have previously been visited. If the browser receives an input URL from a user for a web site that has previously been accessed by the client, it is likely that a copy of many of the elements of the page at the URL in question is stored within a cache located at some point in the network between the web server hosting the web page at the URL in question and the client (for clarity's sake, this type of cache is hereinafter known as a "network cache"). In such a situation, to avoid overloading the web server therefore, the browser will initially retrieve a copy of the available elements of the relevant web page from the network cache. Network caching and session caching are thus distinct activities, although they may frequently both take place during the course of accessing a particular web page; the initial copy of the page being retrieved from network cache, and then stored in session cache for the duration of the web session. These modes of operation both act to reduce unnecessary traffic across the network, unnecessary load on the web server, thus providing the client with more rapid access to web pages, and elements of such pages.

However, in both the case of session caching, and network caching, there are likely to be elements of a web page which the code for the page does not permit to be cached. For example in the case of session caching the browser will intermittently check with the web server (usually in response to an action taken by a user in connection with the copy of the page held in session cache, such as for example in the case of a financial web page, clicking a "Check latest share price" icon), whether it has an up-to-date page, i.e. the page is in conformity with what is on the website. In the case of network caching, elements of pages which change over the time interval between occasions on which the page is accessed are updated by retrieving them from web server for the page of interest (i.e. the original source of the page) the when the page is retrieved from network cache. In both instances, there are also likely to be elements of a page for which caching permissions do not exist for commercial reasons. An example of such an element is an advert from a sponsoring enterprise having a hyperlink re-directing a visitor to the sponsor's website when the advert is clicked, known as a "clickthrough". A common commercial agreement for a clickthrough requires the sponsor to pay the administrator (for example) of the original web page each time traffic to the original web page is redirected to the sponsor's site from the original site, since in such a situation the original web site is deemed to have successfully solicited communication between the client and the sponsor. However, if the copy of the page including the clickthrough is stored in cache and a client activates the clickthrough to re-direct to the sponsor's site, the administrators of the original site, will be unaware, and so will be unable to charge the sponsor money which is rightfully owing to them under the terms of the commercial agreement with the sponsor.

The effect of these restrictive permissions which prevent caching of such elements of a page is to prevent the ultimate optimisation of performance for such pages, and yet many of these restrictions exist simply because caching creates a problem of recognising or verifying the role of, for example, a clickthrough on a host web site in establishing communication between a client and an enterprise in whose favour the clickthrough is acting. This problem is not limited to website clickthroughs which attract sponsorship, since there are also instances of sites which need to observe traffic levels, or observe some other action other than a clickthrough as part of their operation.

Nor is the problem limited to the worldwide web, or internet, and nor does caching have to take place for the problem to manifest itself. For example a client in the form of a mobile phone may be sent a text message advert containing either a telephone number and menu option such as "DIAL NOW?", or, in the case of a client mobile which supports WAP operation, a hyperlink to a URL on the world wide web. (NB Henceforth within this specification, adverts, or any other message capable of actuation (for example by clicking a hyperlink, or responding YES to a menu option to DIAL?) to establish communication with a network location will be known as a "pointer"; a term of well-defined scope in computer science, which here is being used in a similar but more general sense). In all of the above instances it is desirable for the dispatchor of the pointer to be able to verify reliably that the advert has been used by the client to establish communication with a particular network location. The same set of circumstances apply, mutatis mutandis, in the case of email messages.

SUMMARY OF THE INVENTION

A first aspect of the present invention seeks to ameliorate this problem by providing a method of establishing contact between a client and a first location within a communication network comprising the steps of:

generating a pointer to the first network location;

communicating the pointer to the client, and including with the pointer a first ID unique to the pointer's provenance;

subsequent to communication of the pointer to the client, activating the pointer and connecting the client to the first network location;

generating a second ID, unique to activation of the pointer by the client; and using the first and second IDs to verify that connection of the client to the first network location occurred using the pointer.

The first and second IDs are typically returned to a predetermined location within the network so that the person responsible for communicating the pointer to the client, and therefore who is at least indirectly responsible for soliciting and establishing contact between the client and the first network location can use the IDs to request payment from the person profiting (or potentially profiting) from connection of the client to the first network location.

In one embodiment the pointer is an advert hosted on a web page at a second network location, and includes a hyperlink to a web page at the first network location. In this example, the pointer is typically communicated to the client firstly by the advertising on the second location's web page, and also subsequently by downloading to the client. In the case of web pages, caching of downloaded pages is the phenomenon which usually gives rise to the need for verification of the role of the pointer in establishing communication In this example, the first ID preferably includes character strings unique to the pointer, and to the host web page, while the second ID includes character strings unique to either the client or cache. Preferably the pointer is part of an object including the first ID and a programme which automatically generates the second ID when the pointer is retrieved from cache, or activated to establish communication with the first network location.

Alternatively the client may be a mobile phone or email account, and no caching of the pointer need necessarily take place. The pointer in this instance could be a text or voicemail message containing a telephone number for another telephone within the network which is actuable in reply to a menu option, such as "DIAL?", or a hyperlink in a text (e.g. in the case of WAP phones) or an email message. Caching may however take place with mobile phones, for example, in that voicemail messages are frequently stored following initial receipt on a central server of the client's mobile network operator.

BRIEF DESCRIPTION OF DRAWINGS

Embodiments of the invention will now be described, by way of example, and with reference to the accompanying drawings, in which.

DESCRIPTION OF PREFERRED EMBODIMENTS

Figure 1:
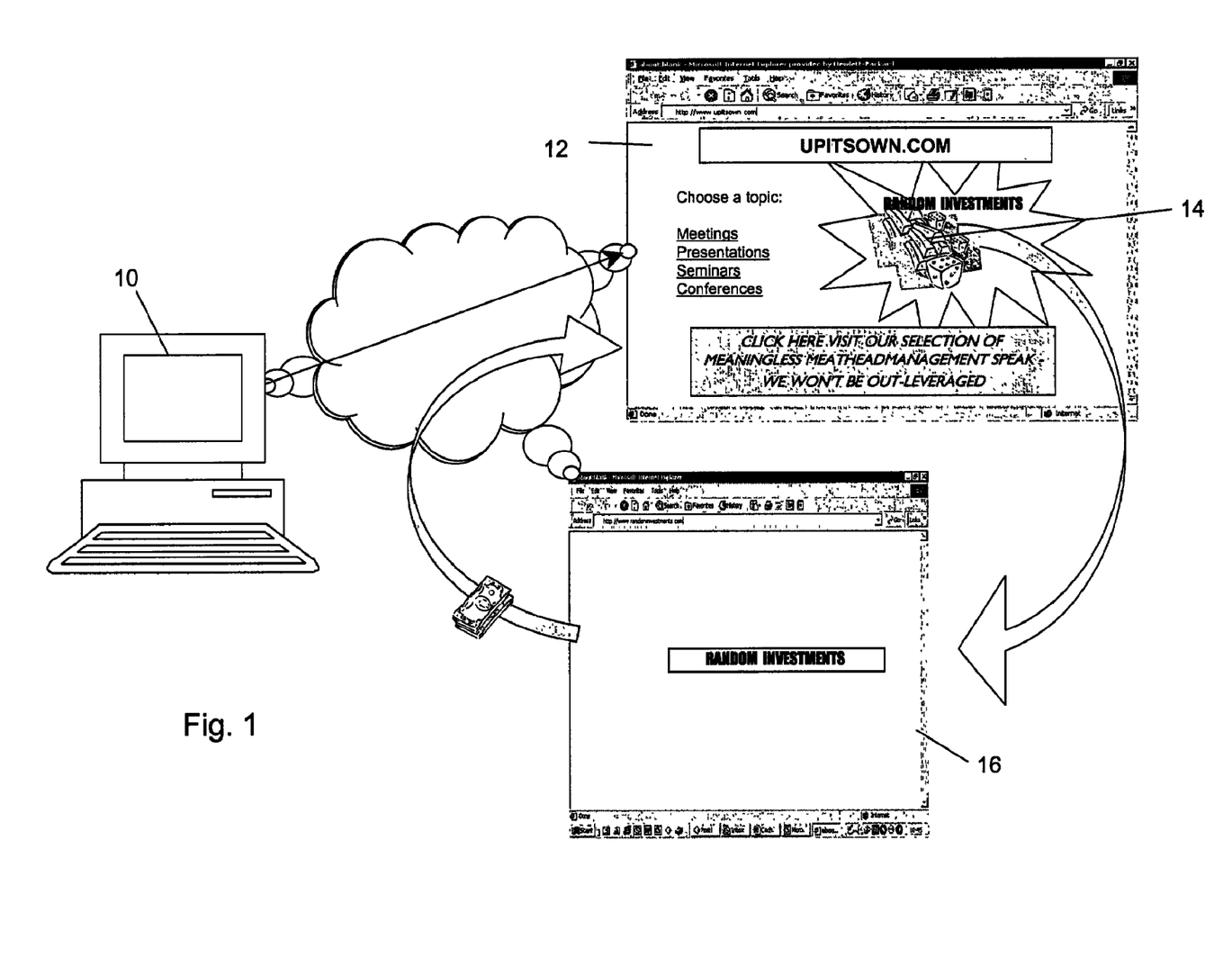
FIG. 1 is a schematic representation of a first scenario in which the method of the present invention is applicable.

Referring now to FIG. 1, in a typical scenario envisioned by the present invention, a client, here in the form of a personal computer 10 connects to a web page 12 "www.upitsown.com" via the internet. On successfully contacting the web page 12, the client notices a pointer to another web site 16 "www.randominvestments.com", to which it decides it then wishes to connect. In this example the pointer has the form of an advert 14 on the web page 12, which incorporates a hyperlink to the "randominvestment" web page 16, also known as a clickthrough. Following connection of the client to the "randominvestments" page via the clickthrough on the "upitsown" page 12, the administrator of the "upitsown" page 12 contacts the administrator of the "randominvestments" page 16 to receive payment for having solicited the communication between the client 10 and the "randominvestments" page 16.

Figure 2:
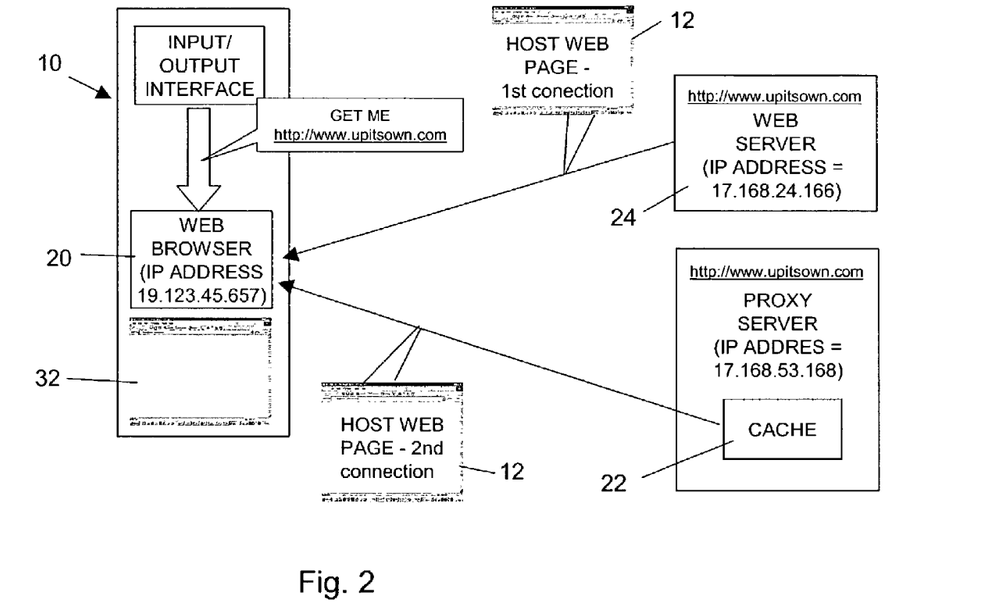
FIG. 2 illustrates alternative events occurring within the scenario of FIG. 1.

This general and high level description of events, as thus far described, is straightforward and without complications. However the use of caching to optimise network performance creates complications in relation to remuneration for the use of the clickthrough by the client. Referring now to FIG. 2, on the first occasion the client connects to the upitsown web page (hereinafter referred to as the host page), the web browser 20 will retrieve the page from the web server 24 for the host website, and download a copy of this into session cache 32 memory, located on the client 10. With a copy of the page stored within the session cache, the client may navigate the page much more quickly, since commands such as scrolling up and down the page do not have to be sent across the network. The process of downloading a copy of the host page from the host web server 24 will typically involve the copy of the page being passed through one or more network locations at which copies of the host page will be cached in one or more network caches. These caches effectively act as proxies for the server of host page, either at the commercial behest of the client (who obtains the benefit of more rapid retrieval), or the host web site (who obtains the benefit of lower load on the host web server 24). On subsequent occasions of connecting to the host web page therefore, the web browser 20 will, on receiving the appropriate command via the user interface, be aware that this is a page which has already been viewed. Instead of seeking to connect to the appropriate URL therefore, the browser 20 will retrieve a copy of the host web page 12 from a network cache memory 22 (here hosted by a proxy server for the host web page) accessible to the browser 20, and located within the network between the host web server 24 and the client 10. In the event that the site has material which is updated regularly, the browser 20 will additionally connect to the web server 24 in order to check that the host web page 12 which it has retrieved from network cache 22 is up-to-date, and will download any modifications (this is likely to occur by the updated page being transmitted to the network cache 22, and a copy of the updated page stored in network cache is then sent on to the web browser 20). The storage of the host web page within the network cache 22 thus reduces the load on the web server 24 and reduces retrieval time for the client, even in the event that modifications to the cached page are required, since these are unlikely to take as long to download as a complete page. Once retrieved from network cache 22, the retrieved copy of the page is again loaded into session cache memory 32 within the client computer 12. At this juncture in the scenario, with a copy of the page stored in session cache 32, the client chooses to activate the clickthrough 14 to randominvestments page 16 (hereinafter the target page). Because the hyperlink in question is located in the session cache memory 32 within the client 12, the administrator of the host web page 12 will not automatically be aware that this event has taken place in the absence of any further action, and so will not receive or seek any remuneration for this event from its sponsors, the target page.

Figure 3A:
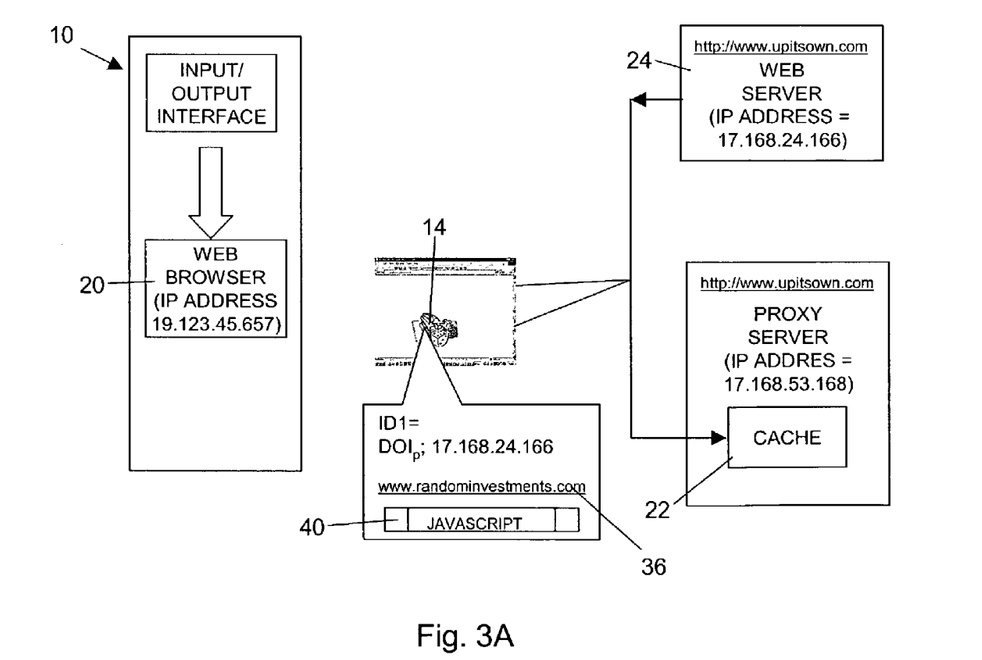
FIGS. 3A to C illustrate an implementation of an embodiment of the present invention in the context of one of the events shown in FIG. 2.

Referring now to FIG. 3A, to ameliorate this problem the pointer provided by the clickthrough 14 to the target page 16 is associated with a small javascript programme 40 (although any suitable language could be used to write this programme), and together these elements may be thought of as comprising an advertising object. The javascript programme 40 performs three principal operations, the first of which is automatically to replicate both itself and the clickthrough 14 each time a copy of the host web page 12 is retrieved from whichever memory location it is occupying. The second principal function of the javascript programme is to generate an identitifer IDn and to attach this to the advertising object each time a copy of the page is retrieved from its contemporaneous memory location. The third operation is actuated automatically only subsequent to the first and second in the event the clickthrough is activated, and will be discussed in more detail later. Thus the advertising object replicates itself initially when a copy of the host page is retrieved from the host site for downloading into the network cache 22 by the adminstrator of the host site. Additionally, at this juncture, the javascript programme 40 of the advertising object creates an identifier ID1, and attaches this to the replicated advertising object of the page stored in the network cache 22. The identifier ID1 includes: (1) the IP address of the machine page on which the clickthrough 14 was originally hosted (17,168.24.166); and (2) the digital object identifier $DOI_p$ of the clickthrough 14. Consequently the identifier ID1 is unique to a particular cickthrough 14 having a particular provenance (any identifier unique to the machine on which the host page is located may be used, such as the MAC address, for example, although this is not preferred since if the machine is changed, the MAC address will also change, whereas the IP address is more stable). Optionally the advertising object may also carry some metadata 36, such as the URL of the site to which the clickthrough 14 relates.

Figure 3B:
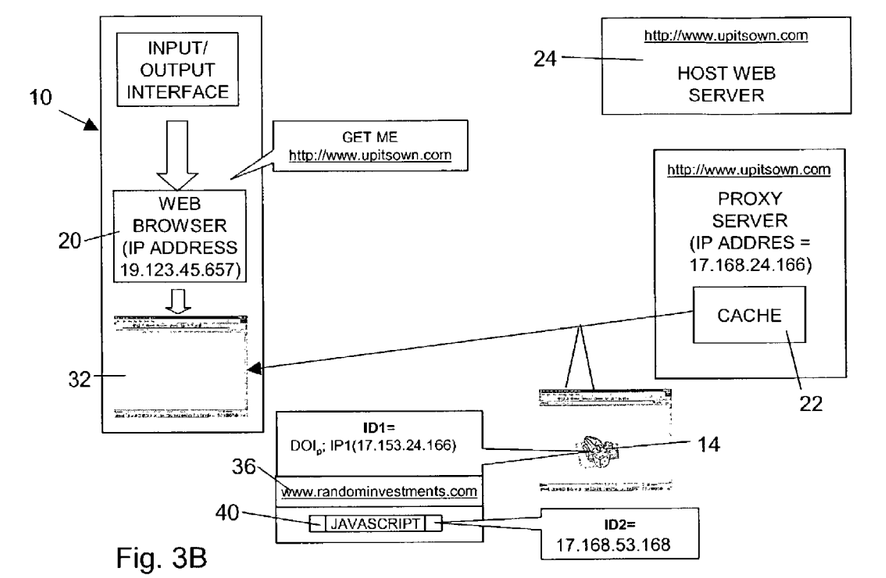
Figure 3C:
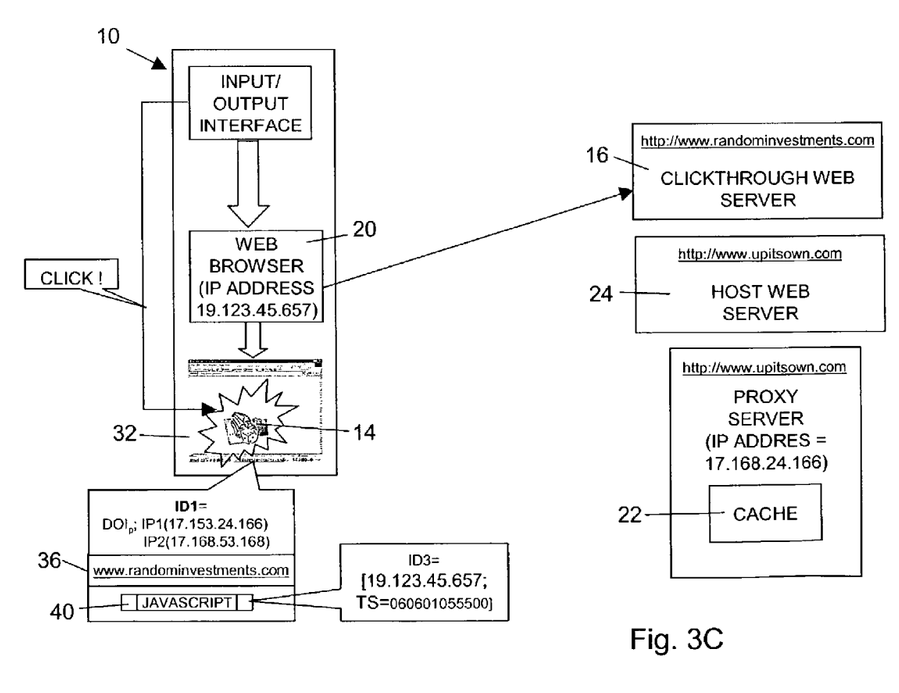

Referring to FIG. 3B, when a copy of the host web page stored in the network cache 22 is retrieved and copied into the client session cache 32 in response to a command on the web browser 20, the javascript programme 40 again acts to replicate the advertising object, generate a further identifier (here ID2), and attach this to the advertising object. The identifier ID2 is simply the IP address of the network cache 22 from which the copy of the page was retrieved. Referring to FIG. 3C, at this juncture, with a copy of the page 12 stored in session cache 32, the client chooses to access the target page 16 using the clickthrough 14. Upon activation of the clickthrough, the javascript programme 40 generates a third identifier ID3, which includes the IP address of the client 10, and a timestamp TS of the time of activation of the clickthrough 14 (i.e. DDMMYYHHMMSS, here 060601055500). The composite identifier comprised by the three individual identifiers ID1, ID2, ID3 provide a comprehensive audit trail for the movement of the particular clickthrough 14 (as denoted by its digital object identifier $DOI_p$) from host web page 12, to network cache 22, and finally to activation in session cache 32 at a given instant in time. Thus they provide a unique identification for the event of the clickthrough 14 being used by the client to establish communication with the enterprise which sponsors the host web page 12. In a modification the identifiers may be folded into the pointer as an argument.

Once the third identifier has been generated, the javascript programme 40 returns the identifiers to the administrator of the host web page 12 to indicate that they are due payment for establishing communication between a client and the target page 16. The composite identifier ID1, ID2, ID3 will also act as proof to the target site that the communication with the client 10 was established as a result of activation of the clickthrough on the host web page: the identifiers ID1 and ID2 being indicative of the provenance and of the clickthrough, and the identifier ID3 enabling the target site, if they so choose, to correlate the event of the client 10 contacting them with transaction records for their own site.

Figure 4:
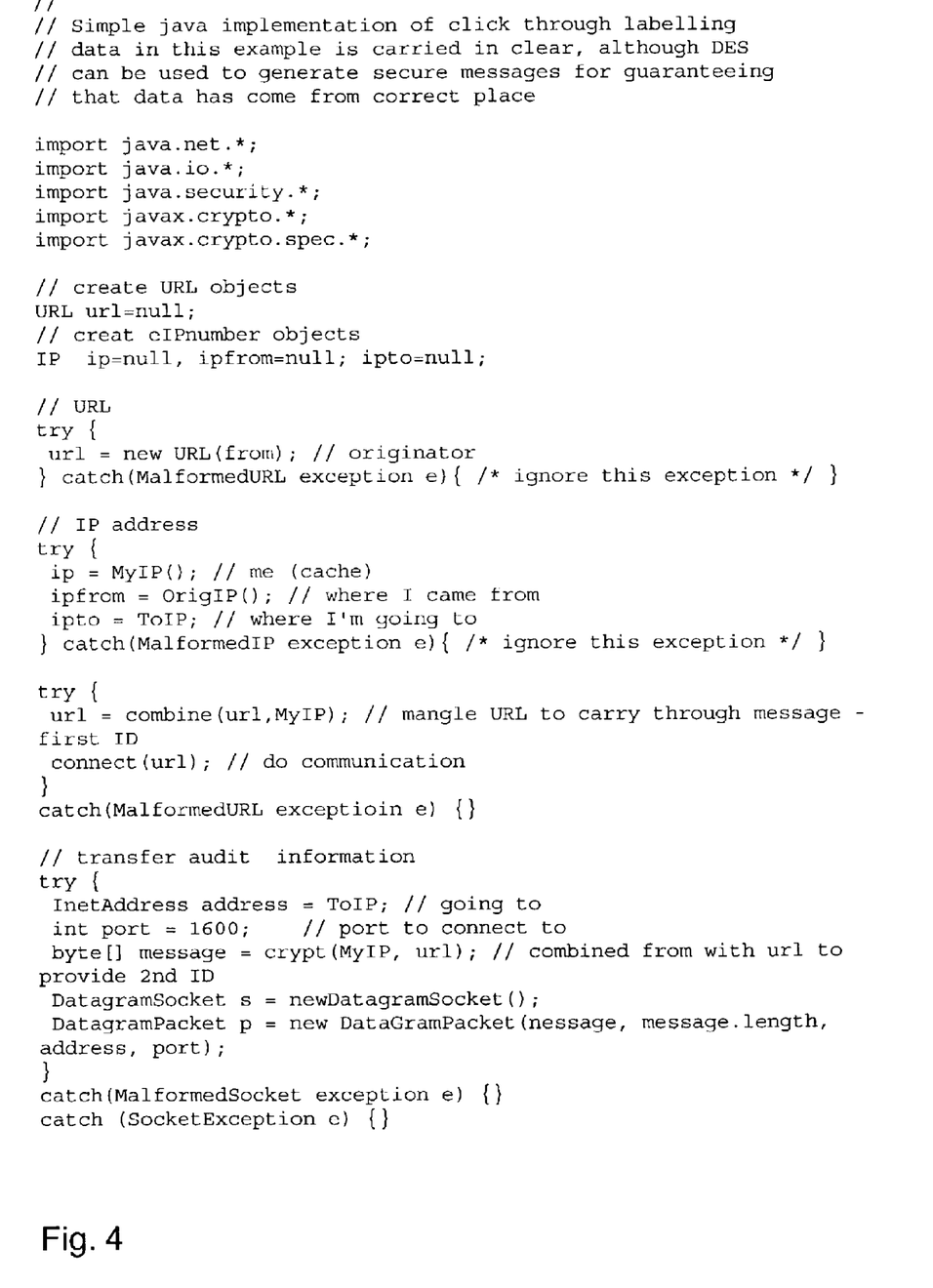
FIG. 4 is a javascript programme by means of which the method of FIG. 3 may be implemented.

Coding for the javascript programme 40 is shown in FIG. 4. The identifiers generated by the programme may be classified into three different types: an origin identifier which in this case is ID1 and includes the $DOI_p$ of the clickthrough and the IP address of the original hosting page; one or more intermediate identifiers such as ID2, simply giving the IP address of browser or other cache locations within the network where copies of the page have been stored; and ID3, an activation identifier indicating the IP address of the network location from which the clickthrough was activated, and the time of such activation.

The number of identifiers which are generated is thus related to the number of different intermediate caching steps that take place. It follows therefore that it is not necessary for three identifiers to be generated, since it may for example occur that the client chooses to activate the clickthrough 14 on the first occasion that the client has access to the page 12. In this event a copy of the host page will be stored in session cache 32 having been copied and retrieved directly from the host web server 24. In such a scenario, origin and activation identifiers (corresponding to ID1 and ID3 in the above example) are generated, but no intermediate identifiers One potential problem with this method is that operating systems for certain memory caches are extremely efficient in conserving memory space, and remove from web pages that are stored within them anything that might be termed extraneous to the object stored (in this example a web page). This may result in the javascript programme 40, and possibly also the identifier ID1 inadvertently being stripped from the copy of the page stored in the network cache 22. Should this happen the javascript programme is equipped to deal with this by folding the identifiers into the pointer.

A further and less frequent problem relates to the deliberate and unscrupulous removal of the javascript programme and identifier for the purpose of avoiding incurring payment. This may be dealt with by the use of trusted entities for the provision of network cache services.

Figure 5A:
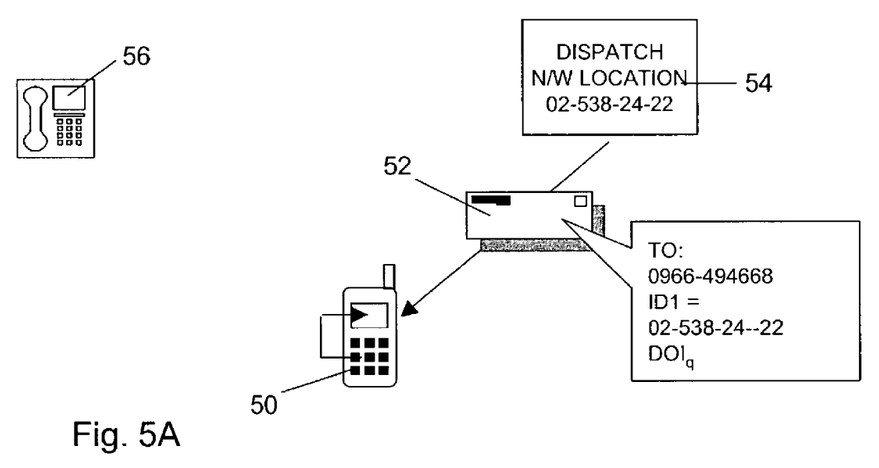
FIGS. 5A and 5B illustrate events within a further embodiment of the present invention.
Figure 5B:
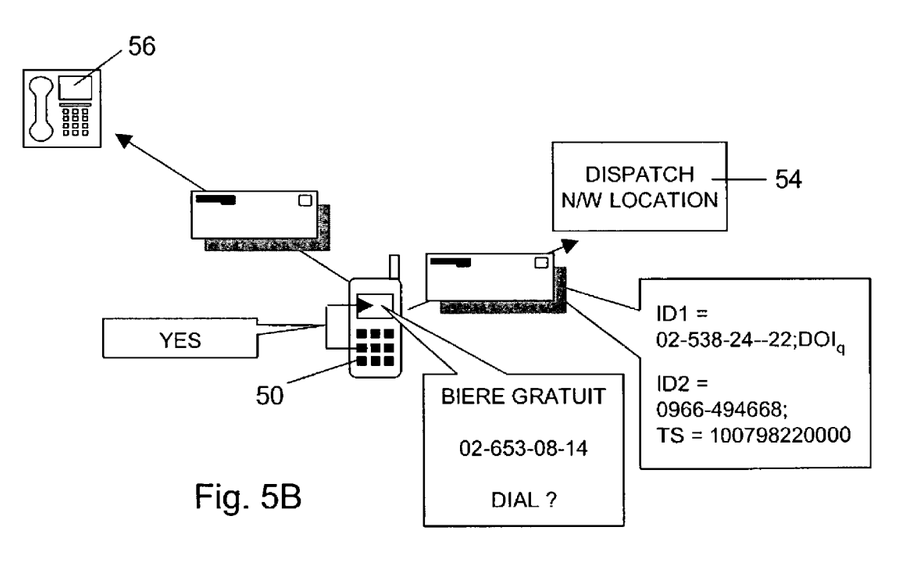

Although a prominent application of the present invention lies in its use to enable caching of previously uncacheable elements of web pages, other equally important applications exist. Referring now to FIGS. 5A and 5B, a client in this example is a mobile telephone 50. The client has a text (also known as SMS) message 52 communicated to it via the mobile telephone network—here simply by dispatch directly to the client from a pubicising party 54 within the telephone network. The text message includes a pointer, which in this example is provided by text advertising a service available at a particular network location 56, and includes a link to the location 56, which here is simply the number of the terrestrial telephone constituting the network location 56 and an associated menu option ("DIAL?"). The link therefore acts for telephones in a manner analogous to a web hyperlink; if the YES button on the client is pressed, then activation of the message by the client will automatically result in connection to the network location 56. The text message additionally includes an identifier ID1 unique to the pointer and the location within the network from which the pointer was despatched, and here ID1 includes the telephone number of the dispatching network location, and the digital object identifier $DOI_q$ of the pointer. Upon activation of the pointer to connect to the enterprise at network location 56, a javascript programme associated with the pointer operates to generate a second identifier ID2, which in this example comprises the telephone number of the client contacting the enterprise at this network location 56, and the time at which this occurs (again in the format DDMMYYHHMMSS). The javascript programme then operates to return the two identifiers to the dispatching location within the network, and these are used to request remuneration for the role of the pointer in establishing communication between the client and the enterprise.

In a modification of this scenario, the message may be a voicemail message, which includes a pointer by virtue of menu options (e.g. "to dial the enterprise, press 1"), and which is stored in a central memory of the mobile telephone operator, which therefore serves as a cache for the message, located remote from the client. In accordance with standard mobile network practices this message may be stored for a period of time after first receipt and retrieval, and may also be copied and sent to other users of the network. The javascript programme therefore generates a further identifier IDn each time the message is copied, and attaches this to the copied message, so that in the event a copy of the message is sent to a friend, for example, and the friend then activates the pointer in that copy of the message to connect to the enterprise, the identifying string ID1, ID2, IDn will be returned upon activation of the pointer. In addition to signifying that a pointer dispatched from the publicising party in the network was used to establish communication between a client (in this case the friend) and the enterprise, the identifying string will also reveal that the pointer has been passed indirectly to the friend, and the identity (given by the phone number in ID2) of the person who passed the pointer to the friend, so that they may be reimbursed under a "recommend a friend" scheme, by the dispatching party.

In a further embodiment, not described herein in detail, the present invention is applied to email, for example where the pointer is a publicity email including a hyperlink. In this instance, the method described in connection with SMS messaging on mobile telephones is applied mutatis mutandis.

The invention claimed is:

1. A method of establishing contact between a client and a first location within a communication network comprising the steps of:
    generating a message which is actuable to establish communication with the first network location;
    communicating the message to the client, and including with the message a first ID unique to the message's provenance;
    subsequent to communication of the message to the client, activating the message and connecting the client to the first network location;
    generating, by the client, a second ID based on client activation of the message; and
    verifying that connection of the client to the first network location occurred using the message by using the first and second IDs.

2. A method according to claim 1 wherein the message is hosted on a web page at a second network location, and the message, as communicated to the client, includes advertising the message to the client on the web page.

3. A method according to claim 2 wherein the client responds to the message, as communicated to the client, by downloading an object from the web page, which object includes the message and the first ID.

4. A method according to claim 3 further comprising the step, subsequent to download, of storing the object in cache memory.

5. A method according to claim 4 further comprising the step of retrieving the object from cache memory prior to activation of the message.

6. A method according to claim 3 wherein the object further includes a program that generates the second ID automatically in response to retrieval of the object from cache memory.

7. A method according to claim 3 wherein retrieval of the object from cache memory occurs in response to a request at the client to connect to the web page at the second network location.

8. A method according to claim 1 including the step of returning the first and second IDs to a predetermined network location.

9. A method according to claim 2, wherein the first ID includes a character string unique to the host and to the message.

10. A method according to claim 9 wherein the first ID includes a first character string unique to the message and a second character string unique to the host.

11. A method according to claim 1 wherein the second ID includes a character string unique to the client.

12. A method according to claim 11 wherein the second ID includes a character string indicative of a time at which the message was activated to establish connection to the first network location.

13. A method according to claim 2, wherein the message is an advert for a web page at the first network location.

14. A method according to claim 13 wherein the advert includes a hyperlink to the web page at the first location.

15. A method according to claim 3 wherein the cache memory is held by a trusted entity.

16. A method according to claim 1 wherein the client is a mobile telephone.

17. A method according to claim 16 wherein the message is communicated to the client by dispatch to the client via the mobile telephone network from a second network location.

18. A method according to claim 17 wherein the dispatch was unsolicited.

19. A method according to claim 16 wherein the first network location is a further telephone.

20. A method according to claim 17 wherein the message is included within a text message.

21. A method according to claim 20 wherein the message is a hyperlink.

22. A method according to claim 16 further comprising the step of returning the first and second IDs to a predetermined network location.

23. A method according to claim 1 wherein the client is an email account.

24. A method according to claim 22 wherein communication of the message to the client includes the dispatch of an email to the client.

25. A method according to claim 24 wherein the message is a hyperlink.

26. A method according to claim 23 further comprising the step of returning the first and second IDs to a predetermined location within the network.

27. A method according to claim 1 further including proving use of the message in connecting the client to the first network location by using the first and second IDs.

28. A method of establishing contact between a client and a first location within a communication network comprising the steps of:
    generating a message which is actuable to establish communication with the first network location;

communicating the message to the client, and including with the message a first ID unique to the message's provenance;

subsequent to communication of the message to the client, and connection of the client to the first network location as a result of activation of the message, generating, by client execution of an object received in the message, a second ID unique to client activation of the message; and verifying that connection of the client to the first network location occurred using the message by using the first and second IDs.

29. A method of verifying provenance of client traffic to a first network location operating on behalf of an enterprise, comprising the steps of:

posting, at a second network location, a message actuable to establish communication with the first network location, and which includes a first ID unique to the second network location;

subsequent to actuation of the message to connect the client to the first network location, the client generating a second ID unique to at least one of: (a) the client, (b) a time at which the message was actuated, and (c) the cache memory if the message was retrieved from cache memory, wherein the generating comprises execution of an object received in the message; and sending at least one of the first and second IDs to the enterprise.

30. A method of verifying provenance of client traffic to a first network location comprising the steps of generating a message actuable to direct the client to the first network location, the message having a first ID unique to a second network location;

generating a second ID by the client subsequent to actuation of the message, the second ID being unique to at least one of:
the client;
a time at which the message was actuated; and
any cache memory from which the message was retrieved; and sending the first and second IDs to the first network location;

wherein the generating a second ID comprises generating the second ID as a result of execution of at least a portion of the message.

31. A memory storing a program for enabling a web server to establish contact between a client and a first location within a communication network, the program being arranged for causing the web server to perform the steps of:

establishing communication with the first network location via a message including a first ID unique to the message's provenance;

communicating the message to the client;

activating the message and connecting the client to the first network location subsequent to communication of the message to the client;

generating a second ID by the client, wherein the second ID is generated as a result of client activation of the message; and using the first and second IDs to verify that connection of the client to the first network location occurred by using the message.

32. The memory of claim 31 wherein the web server is at second network location and the memory causes the message to be hosted on a web page, and advertising the message to the client by communicating the message to the client.

33. The memory of claim 32 wherein the memory causes (a) the message to be communicated to the client and (b) downloading an object from the web page, which object includes the message and the first ID.

34. A memory storing a program for enabling a web server to establish contact between a client and a first location within a communication network, the program being arranged for causing the web server to perform the steps of:

establishing communication with the first network location via a message including a first ID unique to the message's provenance;

communicating the message to the client; and generating a second ID by the client, wherein the second ID is based on client activation of the message, subsequent to communication of the message to the client and connection of the client to the first network location in response to activation of the message.

35. A memory storing a program for enabling a web server to verify provenance of client traffic to a first network location operating on behalf of an enterprise, the program being arranged for causing the web server to perform the steps of:

posting, at the web server, a message actuable to establish communication with the first network location, the message including a first ID unique to the web server;

generating a second ID by the client unique to at least one of: (a) the client; (b) a time at which the message was actuated; and (c) the cache memory if the message was retrieved from cache memory; the second ID being generated subsequent to and as a result of actuation of the message connecting the client to the first network location; and sending at least one of the first and second IDs to the enterprise.

36. A memory storing a program for enabling a web server to verify provenance of client traffic to a first network location, the program being arranged for causing the web server to perform the steps of:

generating a message actuable to direct the client to the first network location, the message having a first ID unique to the web server;

generating a second ID by the client as a result of client execution of an object received in the message and subsequent to actuation of the message, the second ID being unique to at least one of:
(a) the client; (b) a time at which the message was actuated; (c) any cache memory from which the message was retrieved; and (d) sending the first and second IDs to the first network location.

37. A web server for establishing contact between a client and a first location within a communication network, the web server comprising a computer and memory for:

establishing communication with the first network location via a message including a first ID unique to the message's provenance;

communicating the message to the client;

activating the message and connecting the client to the first network location subsequent to communication of the message to the client;

generating, by the client, a second ID based on client activation of the message; and using the first and second IDs to verify that connection of the client to the first network location occurred using the message.

38. The web server of claim 37 wherein the computer and memory are arranged for causing (a) message to be hosted on a web page at the web server, and (b) communication of the message to the client so the message is advertised to the client on the web page.

39. The web server of claim 38 wherein the computer and memory are arranged for causing the web server to communicate the message to the client so there is downloading of an object from the web page which object includes the message and the first ID.

40. The web server of claim 37 wherein the computer and memory are arranged for causing the first and second IDs to be used as proof of use of the message in connecting the client to the first network location.

41. A web server for establishing contact between a client and a first location within a communication network, the web server comprising a computer and memory for: (a) establishing communication with the first network location via a message including a first ID unique to the message's provenance, (b) communicating the message to the client, (c) generating a second ID by the client, wherein the second ID is based on client activation of the message, subsequent to communication of the message to the client and connection of the client to the first network location in response to activation of the message.

42. A web server for verifying provenance of client traffic to a first network location operating on behalf of an enterprise, the web server including a computer and memory for:
(a) posting on the web server a message actuable to establish communication with the first network location, the message including a first ID unique to the web server, (b) generating a second ID by the client unique to at least one of: (i) the client, (ii) a time at which the message was actuated, and (iii) if the message was retrieved from cache memory, the cache memory, (c) generating the second ID as a result of client execution of an object received in the message and subsequent to actuation of the message to connect the client to the first network location, and (d) sending at least one of the first and second IDs to the enterprise.

43. A web server for verifying provenance of client traffic to a first network location, the web server including a computer and memory for (a) generating a message actuable to direct the client to the first network location, the message having a first ID unique to the web server, (b) the client generating a second ID subsequent to and as a result of actuation of the message, the second ID being unique to at least one of: (i) the client, (ii) a time at which the message was actuated, and (iii) any cache memory from which the message was retrieved, and (c) sending the first and second IDs to the first network location.

44. A method of operating a web server in a network including a client and first location, the method comprising:
generating a message which is actuable to establish communication with the first network location;
communicating the message from the web server to the client via the network, the message including a first ID unique to the message's provenance;
subsequent to communication of the message to the client, activating the message and coupling the client and the first network location to each other via the network;
generating, by the client, a second ID unique to and based on client activation of the message by the client; and
using the first and second IDs to verify that connection of the client to the first network location occurred using the message.

* * * * *